US009983093B2

(12) United States Patent
Allen

(10) Patent No.: US 9,983,093 B2
(45) Date of Patent: May 29, 2018

(54) ASSESSING THE ROAD QUALITY OF ONE OR MORE ROAD SEGMENTS IN A ROAD NETWORK

(71) Applicant: Here Global B.V., Eindhoven (NL)

(72) Inventor: Adam Allen, Carlsbad, CA (US)

(73) Assignee: HERE GLOBAL B.V., Eindhoven (NL)

( * ) Notice: Subject to any disclaimer, the term of this patent is extended or adjusted under 35 U.S.C. 154(b) by 849 days.

(21) Appl. No.: 13/887,960

(22) Filed: May 6, 2013

(65) Prior Publication Data

US 2014/0330526 A1 Nov. 6, 2014

(51) Int. Cl.
*G01M 5/00* (2006.01)
*G06Q 50/26* (2012.01)

(52) U.S. Cl.
CPC ....... *G01M 5/0025* (2013.01); *B60T 2210/14* (2013.01); *B60T 2210/36* (2013.01); *G06Q 50/26* (2013.01)

(58) Field of Classification Search
CPC ...... G01M 5/0025; E01B 35/06; G06Q 50/26; B60T 2210/36; B60T 2210/14
See application file for complete search history.

(56) References Cited

U.S. PATENT DOCUMENTS

| | | | | |
|---|---|---|---|---|
| 2010/0174576 A1* | 7/2010 | Naylor | | G06Q 10/04 701/31.4 |
| 2012/0053805 A1 | 3/2012 | Dantu | | |
| 2012/0239173 A1* | 9/2012 | Laikari | | A61B 5/1112 700/91 |
| 2013/0332113 A1* | 12/2013 | Piemonte | | H04M 1/72569 702/189 |

OTHER PUBLICATIONS

Eriksson et al., "The Pothole Patrol: Using a Mobile Sensor Network for Road Surface Monitoring" MobiSys'08, Jun. 17-20, 2008.*
Hull et al., "CarTel: A Distributed Mobile Sensor Computing System" SenSys'06, Nov. 1-3, 2006.*
Abdi, "Normalizing Data" In Neil Salkind (Ed.), Encyclopedia of Research Design, 2010.*
Chen et al., "Road Condition Monitoring Using On-board Three axis Accelerometer and GPS Sensor" 2011 6th International ICST Conference on Communications and Networking in China (CHINACOM), 2011.*
About Street Bump, Apr. 11, 2013, www.streetbump.org/about.
Vittorio Astarita et al., A Mobile Application for Road Surface Quality Control: UNIquALroad, Sep. 10-13, 2012, Energy Efficient Transportation Networks, Paris.
Yu-Chin Tai et al. Automatic Road Anomaly Detection Using Smart Mobile Device:, Deprtement of Computer Science and Information Engineering, National Taiwan University, Taipei, Taiwan, 2010.

* cited by examiner

*Primary Examiner* — John Kuan
(74) *Attorney, Agent, or Firm* — Alston & Bird LLP

(57) ABSTRACT

A road quality of one or more road segments in a road network may be assessed. Motion data may be obtained via a plurality of mobile devices associated with a plurality of vehicles traveling in the road network. The road network may include a plurality of road segments. The obtained motion data may be analyzed. The analyzing may include normalizing the obtained motion data. The road quality of one or more of the plurality of road segments in the road network may be determined based on the analyzing.

18 Claims, 6 Drawing Sheets

ASSESSING THE ROAD QUALITY OF ONE OR MORE ROAD SEGMENTS IN A ROAD NETWORK

BACKGROUND

The present embodiments relate to assessing the road quality of one or more road segments in a road network.

Road networks typically include one or more road segments containing road anomalies, such as, for example, potholes, bumps, railroad crossings, drainage ditches, and manhole covers. These road anomalies are often a source of irritation or frustration for drivers of vehicles traveling on or along these road segments. These road anomalies may also cause damage to vehicles that swerve to avoid or drive over, or even close to, one or more of the anomalies. In turn, drivers may pass their frustration on to and/or seek compensation for damage from the government entity responsible for maintaining and/or repairing the road segments containing the anomalies.

Systems have been developed that help government entities identify road anomalies, but these systems are associated with a number of disadvantages. The City of Chicago has, for example, set up a website that allows drivers to report road anomalies such as potholes and large bumps. Road anomalies are, however, only identified when drivers take note of road anomalies and the location of the road anomalies, decide to report the road anomalies, and actually report the road anomalies at a later time. Since there is a gap between the observation and the reporting of the road anomalies, drivers may not accurately report the precise location of the road anomalies. In some cases, drivers may totally forget to report the road anomalies. The City of Boston has, as another example, developed a mobile application, known as "Street Bump," that collects motion and location data using the accelerometer and global positioning system (GPS) of the associated mobile device. In turn, Street Bump uploads the collected motion and location data to a central server that attempts to identify potholes and large bumps from the uploaded data. Boston's Street Bump application has generally been regarded as a failure because it has a small user base (the application does not provide any other functionality, so few drivers actually utilize the application), identifies a large number of false positives, such as railroad crossings and manhole covers, that are not actually indicative of road quality, and requires that drivers actually drive into the potholes or over the large bumps for those anomalies to be accurately identified.

SUMMARY

To address these and other objectives, the present embodiments relate to assessing the road quality of one or more road segments in a road network.

A method for assessing a road quality of one or more road segments in a road network may be provided. Motion data may be obtained via a plurality of mobile devices associated with a plurality of vehicles traveling in the road network. The road network may include a plurality of road segments. The obtained motion data may be analyzed. The analyzing may include normalizing the obtained motion data. The road quality of one or more of the plurality of road segments in the road network may be determined based on the analyzing.

BRIEF DESCRIPTION OF THE DRAWINGS

Exemplary embodiments of the present invention are described herein with reference to the following drawings.

DETAILED DESCRIPTION OF THE PRESENTLY PREFERRED EMBODIMENTS

The present embodiments aim to provide methods, computer readable storage media with instructions, and systems for easily and accurately assessing the road quality of one or more road segments in a road network. To assess the road quality of one or more road segments, motion data is obtained via a plurality of mobile devices associated with a plurality of vehicles traveling in the road network. The motion data may, for example, be three-axis motion data collected via an accelerometer of each of the plurality of mobile devices. The motion data is then analyzed. The motion data may be normalized to prevent, or at least minimize, errors and inconsistencies in the motion data due to differences (e.g., different suspension systems) in the plurality of vehicles. The motion data may also be filtered to reduce the number of false positives, which are generally not, but may be mistakenly identified as being, indicative of road quality. Based on the analysis of the motion data, the road quality of the one or more road segments may be determined or assessed. In doing so, one or more road imperfections, such as potholes, bumps, uneven surfaces, that are generally indicative of a poor, sub-par, or less than ideal road quality, may be identified. A road quality report may be generated based on the determined or assessed road quality. The road quality report may, for example, include the one or more road imperfections. The road quality report may, in turn, be provided to a governmental entity, such as one responsible for maintaining and/or repairing the one or more road segments.

By obtaining data via the mobile devices as the associated vehicles are traveling in the road network, minimizing errors or inconsistencies in the obtained data, and reducing false positives, the present embodiments may easily and more accurately assess the road quality of the one or more road segments. By providing the governmental entity with a road quality report based on the determined or assessed road quality, the present embodiments may help the entity identify road segments in the road network in need of maintenance (e.g., repair).

Figure 1:
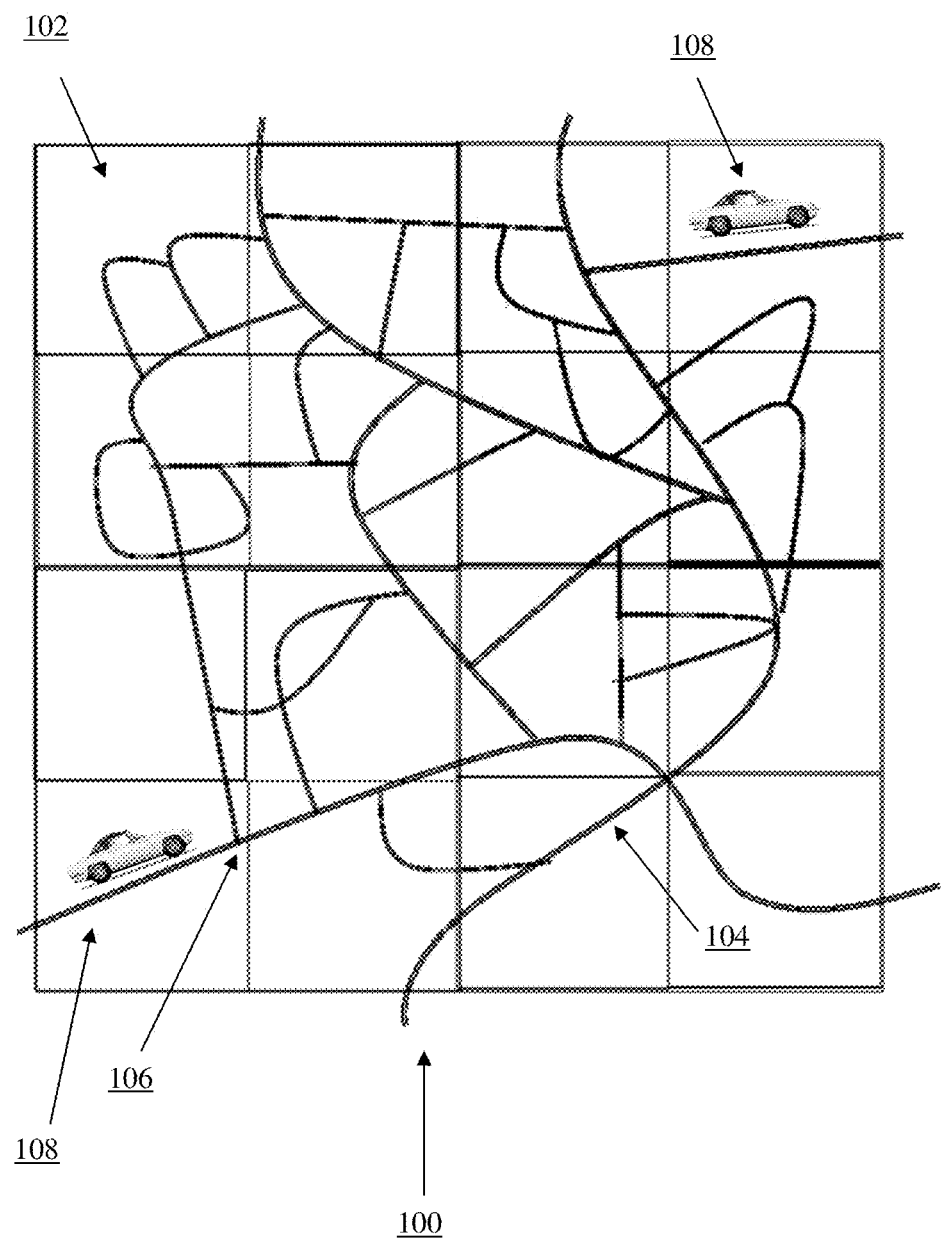
FIG. 1 depicts an exemplary map of a geographic region.

FIG. 1 is diagram illustrating a geographic region 100. The region 100 may be a country (e.g., France), state (e.g., Illinois), province, city (e.g., Chicago), metropolitan area (e.g., the New York metropolitan area), county (e.g., Cook County, Ill.), any other municipal entity, or any other area of comparable or different size. Alternatively, the geographic region 100 may be a combination of one or more countries, states, cities, metropolitan areas, and so on. The region 100 may represent locations without reference to geo-political boundaries, such as being a rectangular region centered on or relative to a particular point or location.

The region 100 includes a road network 102. The road network 102 may include, among other things, a plurality of road segments 104 connected at intersections 106 throughout the region 100. Each road segment 104 may be or represent an entire road or may be a portion of the entire road. One, some, or all of the road segments 104 may include or have one or more road anomalies, such as road imperfections (e.g., potholes, bumps, uneven surfaces) that are generally indicative of road quality, particularly poor or less than ideal road quality, and/or other road anomalies (e.g., railroad crossings, manhole covers, drainage ditches, etc.) that are typically man-made and are generally not indicative of road quality, particularly poor or less than ideal road quality. For example, one road segment 104 may include a pothole, another road segment 104 may include a series of bumps, and a third road segment 104 does not include any road imperfections, but includes a railroad crossing. The road network 102, particularly one or more of the road segments 104 and/or the intersections 106, may, in other embodiments, vary from what is depicted in FIG. 1.

As shown in FIG. 1, a plurality of vehicles 108 may, at any time, travel on, over, or along one or more road segments 104 of the road network 102. The plurality of vehicles may include cars, trucks, motorcycles, buses, bicycles, other vehicles, or combinations thereof. As such, the plurality of vehicles may have or utilize different components, such as tires, engines, and/or suspension systems. The vehicles 108 may thus respond differently to road anomalies (e.g., road imperfections, railroad crossings, etc.) on or in the road network 102.

Though not illustrated herein, the region 100 may also include one or more points of interest ("POIs"), such as businesses, stores, municipal entities, tourist attractions, and/or other points of interest not explicitly described herein. The region 100 may also include one or more topographical features (e.g., bodies of water, mountains, hills, etc.) of the geographic region 100. The region 100 may also or alternatively include a pedestrian network having sidewalks and pedestrian paths, a bicycle network having bike paths, bike lanes on road segments, and/or road segments appropriate for bicycle travel, a public transit network including, for example, railroads, public bus lines, tourist bus lines, metro railway lines (e.g., subways and elevated lines), light rail (e.g., trams, trolleys, or street cars), water taxi, and stations and/or stops for one or more of each, or combinations thereof. The region 100 may include other networks, features, and/or points as well.

Figure 2:
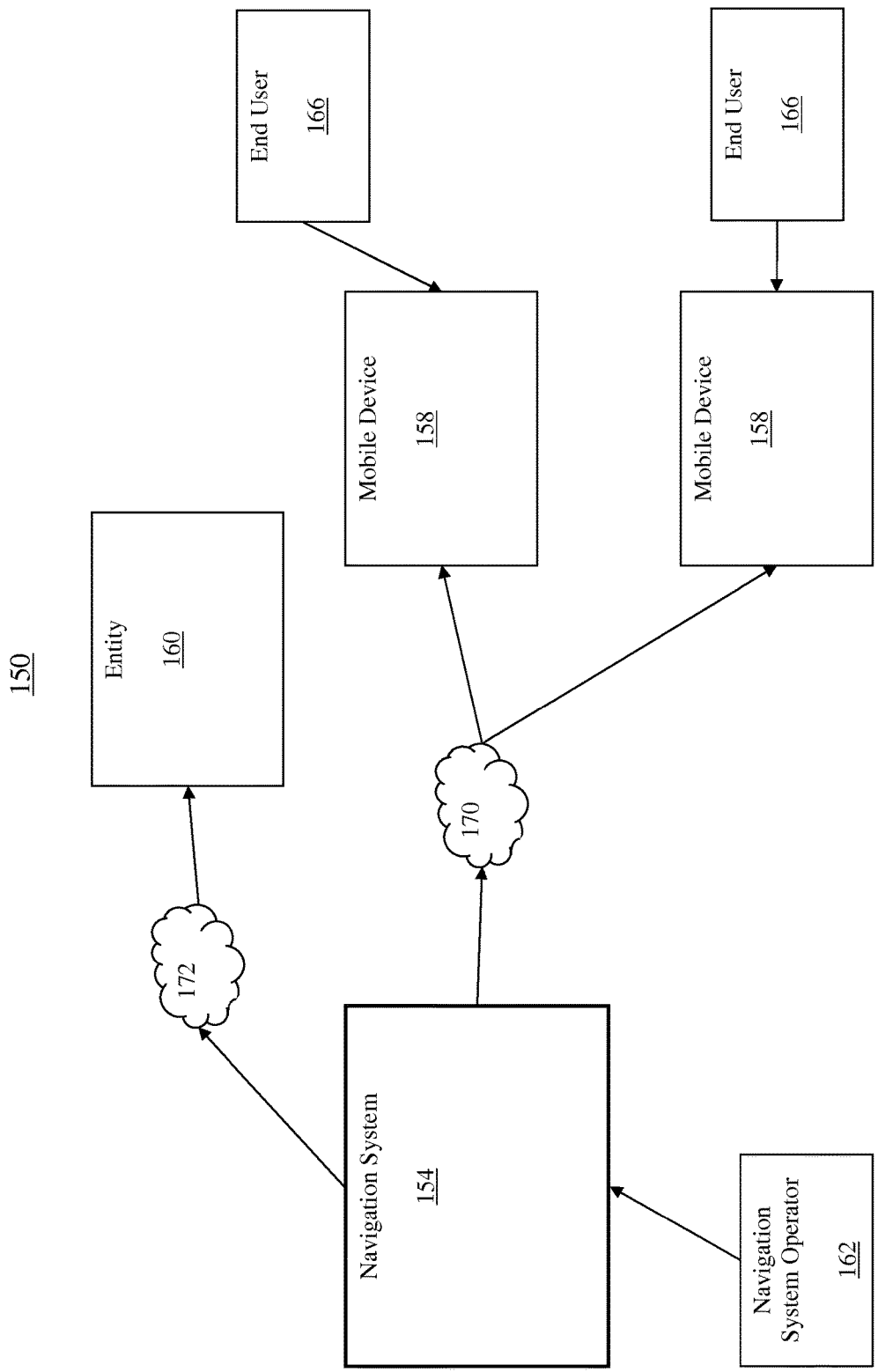
FIG. 2 depicts a block diagram of one embodiment of a system for assessing road quality of one or more road segments in a road network.

FIG. 2 shows a block diagram of one embodiment of a system 150 for assessing the road quality of one or more road segments 104 in the road network 102. The system 150 includes a navigation system 154, a plurality of mobile or portable devices 158, and an organization or entity 160. The navigation system 154 is developed and/or operated by, or otherwise associated with, a system operator 162 (e.g., Nokia Corp.). The plurality of mobile devices 158 are associated with (e.g., owned, operated by) a plurality of end users 166. The navigation system 154 is coupled with or connected to the plurality of mobile devices 158 via a communication network 170. The navigation system 154 is also coupled with or connected to the one or more organizations or entities 160 via a communication network 172. As used herein, the phrases "in communication" and "couple" include a direct connection or an indirect connection through one or more intermediate components. Such intermediate components may include hardware and/or software based components.

In other embodiments, the system 150 may include additional, different, or fewer components. For example, the system 150 may include only one mobile device 158. As another example, the system 150 may include additional entities 160. In other embodiments, the navigation system 154, or components thereof, may be partially or fully located within or be part of one or more of the mobile devices 158. In yet other embodiments, the navigation system 154 (or individual components thereof, as described below) may be implemented as computer program logic or computer readable program code stored in a memory and/or storage of a computer, such as the computer 400 described below with respect to FIG. 6, and executable by one or more processors thereof to implement the disclosed functionality.

The plurality of mobile devices 158 are also associated with the plurality of vehicles 108 traveling on, over, or along the road network 102. The number of vehicles 108 may be equal to or less than the number of mobile devices 158 and end users 166. For example, two or more end users 166 may be traveling in the same vehicle 108. The plurality of mobile devices 158 may be positioned (e.g., mounted, secured, held, embedded) anywhere within or outside of the plurality of vehicles 108. For example, one or more of the mobile devices 158 may be mounted to a dashboard of one or more vehicles 108. As another example, one or more of the mobile devices 158 may be held by one or more of the end users 166 within one or more vehicles 108. In yet another example, one or more of the portable devices 158 may be embedded within or be part of one or more vehicles 108. The plurality of mobile devices 158 may be oriented in any number of ways within or outside of the plurality of vehicles 108. For example, one or more of the mobile devices 158 may be oriented in an upright or vertical orientation within one or more of the vehicles 108. As another example, one or more of the mobile devices 158 may be oriented in a horizontal orientation within one or more of the vehicles 108.

The entity 160 is generally associated with (e.g., responsible for) the operation and/or maintenance (e.g., repair) of one or more road segments 104 in the road network 102. The entity may be a government municipality, such as, for example, a county, city, town, village, province, state, or other government unit. The entity may be a non-governmental organization, such as a business organization (e.g., a corporation). For example, the entity 160 may be a county responsible for operating and/or maintaining all of the road segments 104 in the road network 102. In other embodiments, two or more organizations or entities 160 may be associated with the operation and/or maintenance of one or more road segments 104 in the road network 102. For example, a county and a state may share responsibility for operating and maintaining one or more road segments 104 in the road network 102. The entity 160 may be associated with (e.g., have, utilize) a data collection database configured to obtain data indicative of the determined or assessed road quality (e.g., road quality reports including such data).

The networks 170, 172 may be wireless networks, wired networks, or combinations of a wired and wireless network, such as an 802.11x compliant network. The networks 170, 172 may include publicly accessible networks, such as the Internet, private networks, or combinations thereof. In one embodiment, the network 170 is the same as the network 172 (and vice-versa). In other embodiments, the network 172 may be a different type of communication network, such as a traditional mailing network. The type and configuration of the communication network 170 are implementation dependent, and any type of communication network that facilitates the described communications between the navigation system 154 and the plurality of mobile devices 158, available now or later developed, may be used.

Figure 3:
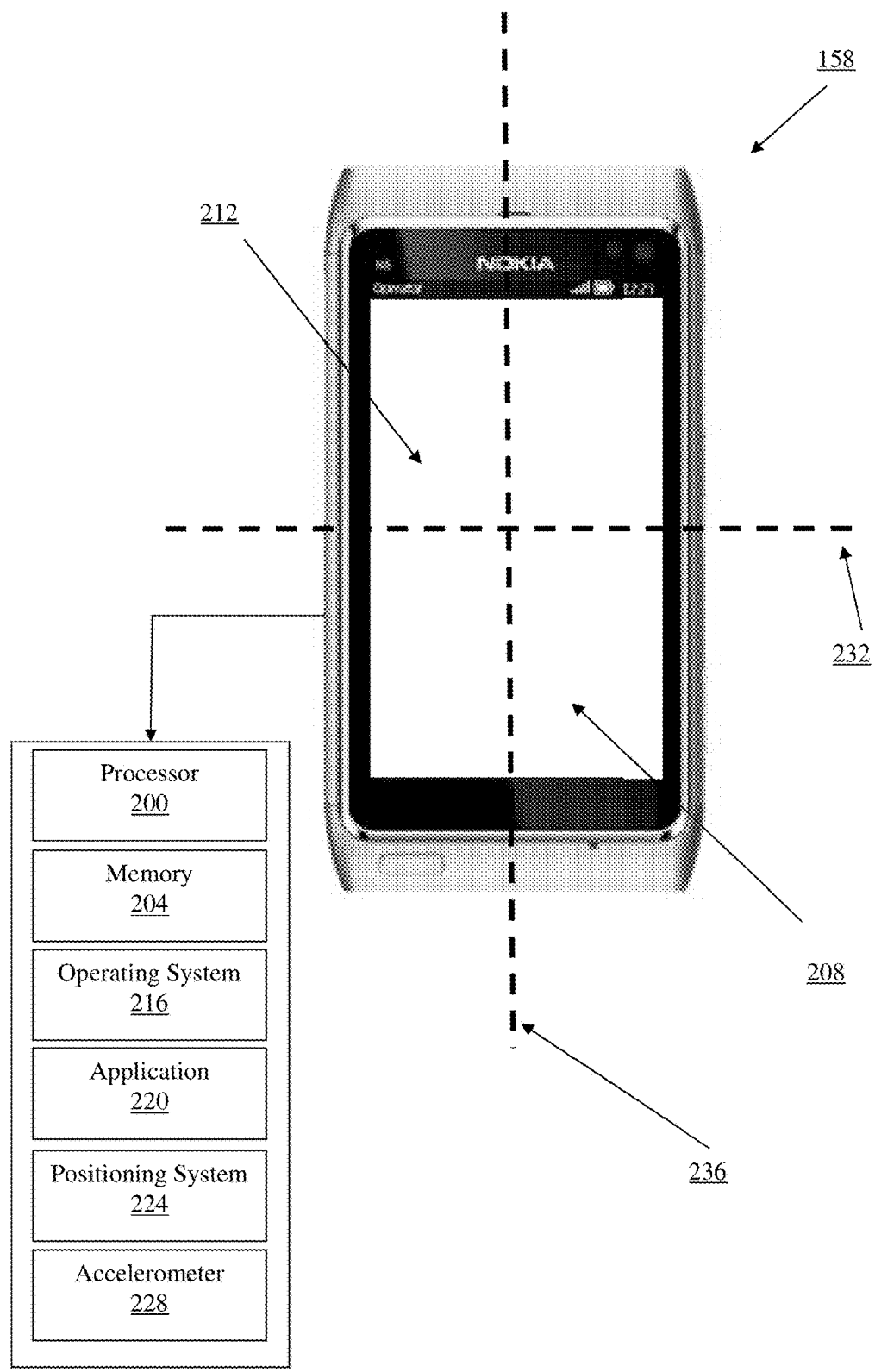
FIG. 3 depicts a more detailed view of an exemplary mobile device of the system of FIG. 2.

FIG. 3 shows an exemplary mobile or portable device 158. In the illustrated embodiment, the mobile device 158 is a smart phone (e.g., manufactured by Nokia Corp.). The mobile device 158 may also be a mobile phone, a personal digital assistant ("PDA"), a tablet computer, a notebook computer, a personal navigation device ("PND"), a portable navigation device, or other known or later developed portable or mobile device. The portable device 158 may, in one embodiment, be a device embedded within a vehicle 108 (i.e., the device is part of the vehicle 108). The plurality of mobile devices 158 may thus be or include one or more smart phones, one or more mobile phones, one or more PDAs, one or more tablet computers, one or more notebook computers, one or more PNDs, one or more portable navigation devices, one or more devices embedded within one or more vehicles 108, one or more other known or later developed portable or mobile devices, or combinations thereof, associated with the plurality of end users 166.

The exemplary mobile device 158 shown in FIG. 3 includes a processor 200, a memory 204, an input device 208, a display 212, an operating system 216, and an application 220. In other embodiments, the mobile device 158 may include additional, fewer, or different components. For example, the mobile device 158 may include additional input devices 208 and/or applications 220.

The processor 200 may be a general processor, a digital signal processor, ASIC, field programmable gate array, graphics processing unit, analog circuit, digital circuit, combinations thereof, or any other known or later developed processor. The processor 200 operates pursuant to instructions in the memory 204.

The memory 204 may be a volatile memory or a non-volatile memory. The memory 204 may include one or more of a read only memory (ROM), random access memory (RAM), a flash memory, an electronic erasable program read only memory (EEPROM), or other type of memory. The memory 204 may include an optical, magnetic (hard drive) or any other form of data storage device. The memory 204 may be removable from the mobile device 158 (e.g., may be a secure digital (SD) memory card).

The input device 208 may be or include one or more buttons, a keypad, a keyboard, a mouse, a stylist pen, a rocker switch, a touch pad, a touch screen, a voice recognition circuit, a heat sensor, a capacitive sensor, an acoustic sensor, or other device or component for inputting data to the mobile device 158. The display 212 may be a liquid crystal display (LCD) panel, light emitting diode (LED) screen, thin film transistor screen, or another type of display. In the illustrated embodiment depicted by FIG. 2, the mobile device 158 has a touch screen, which may be capacitive, resistive, surface acoustic wave, or another type, such that the input device 208 and the display 212 are integrated.

As will be described in greater detail below, the end user 166 may, via or using the input device 208 and/or the display 212, obtain geographic information (e.g., one or more maps) and/or navigational information (e.g., route guidance, route calculation) obtained or received from the navigation system 154. The geographic information and/or navigational information is obtained using or with the software application 220.

The operating system 216 is installed on or in the memory 204 of the mobile device 158 or a separate memory. The operating system 216 may be Linux, Microsoft Windows, Android, iOS, Windows CE, MAC OS X, or any other operating system.

The software application 220 is installed and executable on the operating system 216 of the mobile device 158. The application 220 allows the end user 166 to obtain geographic information and/or navigational information, but also allows the navigation system 154 to obtain road quality data as the vehicle 108 associated with the mobile device 158 travels over, along, or on the road network 102, as will be described in greater detail below.

The application or module 220 may be a mobile or smart phone application ("app"), a Web browser (e.g., Firefox, Internet Explorer), an email application, a messaging application, or other plug in or proprietary application built into or installed on the operating system 166. In one embodiment, the application or module 220 is a proprietary application known as Trapster. The application 220, or components thereof, may be automatically installed on or built into (e.g., come with) the operating system 216 of the mobile device 158 or may be downloaded or obtained (e.g., purchased) by the end user 166 and installed on the operating system 216 of the mobile device 158 after the mobile device 158 has been purchased or otherwise acquired. The application 220 may automatically execute on the mobile device 158 when the mobile device 158 is powering up, in response to a request from the end user 166, or in response to some other trigger or event. The application 220 may be written in a suitable computer programming language such as C, although other programming languages (e.g., C++, Java, etc.) are also suitable. In one embodiment, the application 220 (or individual components thereof, as described below) may be implemented as computer program logic or computer readable program code stored in the memory and/or storage of a computer, such as the computer 400 described below with respect to FIG. 6, and executable by one or more processors thereof to implement the disclosed functionality.

The exemplary mobile device 158 shown in FIG. 3 further includes a positioning system 224. The positioning system 224 includes a global positioning system (GPS) or a cellular or similar position sensor for providing location data. The positioning system 224 may utilize GPS-type technology, a dead reckoning-type system, cellular location, or combinations of these or other systems. The positioning system 224 may include suitable sensing devices that measure the traveling distance, speed, direction, and so on, of the mobile device 158. The positioning system 224 may also include a receiver and correlation chip to obtain a GPS signal. The positioning system 224 outputs or transmits, to the processor 200, data indicative of the measured or determined position and/or the speed of the mobile device 158.

The exemplary mobile device 158 shown in FIG. 3, the mobile device 158 further includes an accelerometer 228. The accelerometer 228 is built or embedded into or within the interior of the mobile device 158. The accelerometer 228 is configured to determine (e.g., recognize, measure, or detect, record) translational and/or rotational movement of the mobile device 158. The translational and/or rotational movement is different than or in addition to movement associated with a change in the geographic location of the mobile device 158. Instead, the translational and/or rotational movement is due to or caused by the vehicle 108 associated with the mobile device 158 traveling over or along and/or moving (e.g., swerving) to avoid one or more road anomalies (e.g., road imperfections, railroad crossings, drainage ditches, etc.), and/or changing the location with a variance other than changes typical for travel along a route.

The accelerometer 228 may determine translational and/or rotational movement of the mobile device 158 along or about its horizontal or x-axis 232, its vertical or y-axis 236, its z-axis (perpendicular to the plane formed by the x-axis 232 and the y-axis 236, also referred to as being into and/or out of the mobile device 158), or combinations thereof. When the accelerometer 228 determines that the mobile device 158 has been moved about its x-axis 232, its y-axis 236, its z-axis, or combinations thereof, the accelerometer 228 determines the magnitude of the rotation of the device 158 about the x-axis 232, the y-axis 236, the z-axis, or combinations thereof. The accelerometer 228 may, for example, determine that the device 158 has been rotated at an angle of 30 degrees, 45 degrees, etc., about the y-axis 236 of the mobile device 158. Alternatively, the accelerometer 228 measures that movement has occurred and/or measures a direction of movement with or without determination of a specific magnitude (e.g., binary decision of threshold magnitude) or measures magnitude without direction. The accelerometer 228 outputs or transmits, to the processor 200, data indicative of the measured or determined movement information of the mobile device 158.

In other embodiments, the exemplary mobile device 158 shown in FIG. 3 may include one or more other detectors or sensors located or positioned anywhere within, outside of, or a combination thereof, of the mobile device 158. The one or more detectors or sensors may be or include one or more optical sensors or detectors (e.g., a camera), one or more motion sensors or detectors (e.g., a tile sensor and/or gyroscope), one or more touch or tactile sensors (e.g., infrared, acoustic, or capacitive sensor), any other known or later developed sensors or detectors, or combinations thereof.

Figure 4:
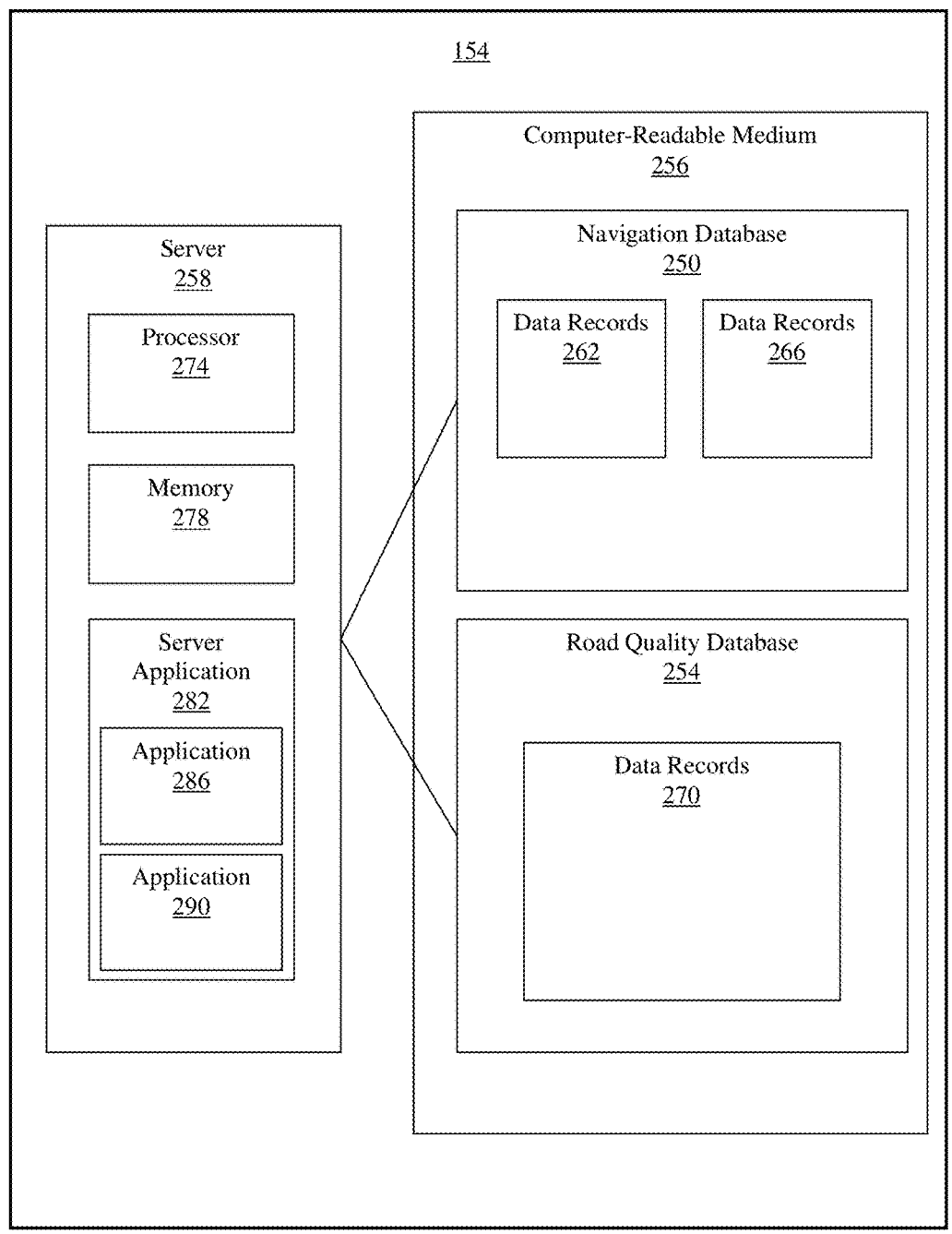
FIG. 4 depicts a more detailed view of an exemplary navigation system of the system of FIG. 2.

FIG. 4 shows a block diagram of the navigation system 154 in greater detail. The navigation system 154 includes a geographic or navigation database 250 and a road quality database 254. The geographic database 250 and the road quality database 254 are stored on a computer readable medium 256, which may include one or more hard drives or other storage medium. The system 154 further includes a server 258 that may access the computer readable medium 256 and the contents thereof. In other embodiments, the system 154 may include additional, different, or fewer components. For example, the road quality database 254 may be separate from the navigation system 154 (i.e., stored elsewhere) or combined with the geographic database 250 into one database. As another example, the server 258 may be part of or separate (e.g., remote) from the geographic database 250 and/or the road quality database 254.

The navigation database 250 stores or maintains geographic data such as, for example, road segment or link data records 262 and node data records 266. The link data records 262 are links or segments representing the road segments 104. The node data records 266 are end points (e.g., the intersections 106) corresponding to the respective links or segments of the road segment data records 262. The road link data records 262 and the node data records 266 may represent, for example, the road network 102 or other road networks used by the vehicles 108 and/or other entities. The road link data records 262 may be associated with attributes of or about the road segments 104, such as geographic coordinates, street names, address ranges, speed limits, turn restrictions at intersections, and/or other navigation related attributes (e.g., one or more of the road segments 104 is part of a highway or tollway, the location of stop signs and/or stoplights along the road segments 104, etc.), as well as points of interest (POIs), such as gasoline stations, hotels, restaurants, museums, stadiums, offices, automobile dealerships, auto repair shops, buildings, stores, parks, etc. The node data records 266 may likewise be associated with attributes (e.g., about the intersections 106), such as geo-graphic coordinates, street names, address ranges, speed limits, turn restrictions at intersections, and other navigation related attributes, as well as POIs, such as gasoline stations, hotels, restaurants, museums, stadiums, offices, automobile dealerships, auto repair shops, buildings, stores, parks, etc. The geographic data may additionally or alternatively include other data records, such as, for example, POI data records, topographical data records, cartographic data records, routing data, and maneuver data. The navigation database 250 and/or the geographic data stored therein may be organized or in any number of different ways.

The road quality database 254 stores or maintains data 270 indicative of the quality of one or more road segments 104 in the road network 102. The road quality data 270 are generally indicative of the condition of the corresponding road segment(s) 104. The road quality data 270 are obtained from or provided by or via one or more of the mobile devices 158 that have traveled or are traveling on, over, or along the one or more road segments 104 in the road network 102. The road quality data 270 may thus include sets or points of data obtained for different road segments 104, by different vehicles 108, at different times, or combinations thereof. Further details regarding the road quality data 270 are described below.

The server 258 may be any type of server, such as, for example, an application server, a database server, a file server, a web server, or other server. The server 258 may include one or more computers and/or may be part of a larger network of servers. As shown in FIG. 4, the server 258 includes a processor 274, a memory 278, and a server application 282. The server application 282 may be stored on one or more hard drives, cache, RAM, or other computer-readable media operated by the server 258 and loaded into the memory 278 of the server 258 to be executed by the processor 274. In other embodiments, the server 258 may include additional, different, or fewer components.

The server application 282 includes a navigation-related server application 286 and a road quality server application 290. The navigation-related server application 286 obtains or accesses the geographic data, particularly the data records 262 and 266, stored or maintained in the navigation database 250. In turn, the server application 286 may provide different geographic and/or navigational information, content, services, features, and/or functions to the end user 166 via, using, or within the application 220 of the mobile device 158. The server application 286 may, for example, generate or provide one or more maps of the geographic data for the end user 166. The server application 286 may, alternatively or in addition thereto, provide or generate route calculation and/or route guidance for the end user 166, and/or provide other navigation-related or map-related information (e.g., position identification). The server application 286 may be written in a suitable computer programming language such as C, although other programming languages, such as C++ or Java, are also suitable.

The road quality server application 290 obtains and/or accesses the road quality data 270 stored or maintained in the road quality database 254. In turn, the road quality server application 290 may analyze the road quality data 270 and/or provide or generate information, services, features, and/or functions to the one or more organizations or entities 160. The server application 290 may, for example, provide reports and/or recommendations, generated based on the road quality data 270 and/or the analysis thereof, to the organization or entity 160 (e.g., a county, town, village, etc.). Like the server application 286, the server application 290 may be written in a suitable computer programming language such as C, although other programming languages, such as C++ or Java, are also suitable.

The system 150 is, as noted above, generally configured to assess or determine the road quality of one or more road segments 104 in the road network 102. With reference again to FIG. 2, each of the plurality of mobile devices 158 is configured to obtain (e.g., collect, gather) the data 270 indicative of the road quality of the one or more road segments 104. When an application 220 is executing on a respective mobile device 158 and the respective mobile device 158 is traveling on, along, or over one or more road segments 104 of the road network 102 via respective associated vehicle 108, the application 220 is configured to obtain (e.g., collect, gather) the data 270 indicative of the road quality of the one or more road segments 104. The application 220 obtains the data 270 indicative of the road quality using or via one or more sensors or detectors of the mobile device 158, such as, for example, the positioning system 224 and/or the accelerometer 228. The data 270 indicative of the road quality may thus be or include position data and/or speed data determined and output by the positioning system 224 and/or motion or sensor data determined and output by the accelerometer 228, such as, for example, accelerometer values (e.g., magnitudes of x-axis movement, y-axis movement, and/or z-axis movement). For example, the data indicative of the road quality may include location data (e.g., GPS coordinates) and 3-axis motion data (i.e., motion data for or corresponding to the x-axis, y-axis, and z-axis). The application 220 may also record time data (e.g., time and/or date) associated with the obtained road quality data. Other data may be collected instead or as well.

The application 220 may automatically obtain the data 270 indicative of the road quality when the application 220 is executing on the respective mobile device 158. The application 220 may, for example, obtain the data 270 at a pre-determined frequency (e.g., 5 times per second), at pre-determined times (e.g., at 12:00 P.M.), and/or only when the respective mobile device 158 is traveling on certain road segments 104 via the respective associated vehicle 108. In other embodiments, application 220 may obtain the data 270 indicative of the road quality in response to a request from the navigation system 154 or the associated end user 166 and/or in response to some other trigger or event.

In some embodiments, the obtained data 270 may be stored in the memory 204 of the respective mobile device 158 and transmitted to the navigation system 154 at a later time. For example, the data 270 may be stored in the memory 204 and then transmitted to the navigation system 154 at a pre-determined frequency (e.g., every 30 minutes), at pre-determined times (e.g., at 12:00 A.M.), when the respective mobile device 158 leaves the one or more road segments 104 and/or the road network 102, in response to a request from the server 258, or in response to some other event or trigger. Alternatively or in addition thereto, the obtained data 270 may be immediately transmitted to the navigation system 154.

Once the navigation system 154 obtains (e.g., receives) the data 270 indicative of the road quality, the navigation system 154, particularly the server 258, may store the data 270 in the road quality database 254 and/or in another database or memory. In some embodiments, a device identifier (e.g., a code) that identifies which mobile device 158 obtained the road quality data 270 may be associated with and stored with the road quality data 270 in the road quality database 254. The device identifier may be obtained from the mobile device 158 or generated by the navigation system 154 after receiving road quality data 270 from the mobile device 158.

The server 258, particularly the road quality server application 290, is configured to analyze the obtained road quality data 270 to determine or assess the road quality of one or more road segments 104. The server 258, particularly the road quality server application 290, is thus configured to analyze obtained position data, motion data, speed data, time data, other data, or combinations thereof. The analysis may be performed for or with respect to one or more specific road segments 104. The analysis may be performed when new road quality data 270 are obtained and stored in the database 254, when a requisite amount of data 270 has been obtained, at a pre-determined frequency (e.g., every 20 minutes), at a pre-determined time, in response to some other trigger event, or combinations thereof. The analysis may be performed any number of times.

As described above, the plurality of mobile devices 158 may be positioned and/or oriented within and/or outside of the vehicles 108 in any number of different ways. In some embodiments, then, one or more of the mobile devices 158 may be oriented differently than other mobile devices 158 while the devices 158 obtaining the road quality data 270. In one embodiment, one or more of the mobile devices 158 may, while obtaining road quality data 270, be oriented in an upright or vertical orientation (see FIG. 3), while one or more other mobile devices 158 also obtaining road quality data 270 may not be. As a result, the data 270 obtained by one or more of the mobile devices 158 may be skewed. In these embodiments, the mobile devices 158 that are not oriented in a generally upright or vertical orientation may, as part of the analysis, need to be re-oriented so that all of the mobile devices 158 are effectively oriented in the same way. The re-orientation of the one or more mobile devices 158 does not involve physically re-orienting the mobile devices 158, but instead effectively re-orienting the one or more accelerometers 228 included in these mobile devices 158. The server 258 may perform the necessary re-orientation using, for example, Euler angles. In other embodiments, the one or more accelerometers 228 may be effectively re-oriented in a different way.

The analysis may include determining (e.g., extracting, identifying, calculating) the one or more road segments 104, or portions thereof, that correspond to the road quality data 270, the one or more mobile devices 158 that provided the road quality data 270, a number of data points or sets obtained for each road segment 104, average speed values of or for one or more road segments 104, times and/or dates associated with the road quality data 270, average or standard deviation acceleration values of or for one or more road segments 104 and/or one or more mobile devices 158, other motion data or values, other data or values, or combinations thereof. The road quality data 270 may be sorted or organized based on one or more of these criteria. For example, the road quality data 270 may be organized based on the road segment 104 to which the road quality data 270 corresponds.

Since the road quality data 270 may be obtained from vehicles 108 that may be of a different size (e.g., a car vs. a truck) and/or have different vehicle components (e.g., suspension systems, tires, etc.), the vehicles 108 may respond differently to the same road anomalies on or in the one or more road segments 104. Thus, the road quality data 270 obtained via mobile devices 158 associated with different vehicles 108 may include errors and/or inconsistencies. Accordingly, the analysis may further include normalizing the road quality data 270 between the different vehicles 108 and/or for specific road segments 104. In some embodiments, the road quality data 270 may be normalized with or using standard deviation. In one embodiment, the road quality data 270 may, for each of one or more road segments 104 and each of one or more mobile devices 158, be normalized as follows: (1) calculating or retrieving (if already calculated), for the respective mobile device 158, the standard deviation for the respective road segment 104, (2) calculating or retrieving (if already calculated) the total standard deviation for the respective mobile device 158, (3) dividing the calculated standard deviation for the respective road segment 104 by the total standard deviation to obtain a percent difference, (4) weighting the percent difference based on the number of data points collected by the respective mobile device 158 for the respective road segment 104 as compared to the total number of data points collected by all mobile devices 158 for the respective road segment 104, (5) summing the weighted values for the respective mobile device 158 to determine the percentage above or below the average or expected road quality value ("normal" road quality) for the road segment 104. In other embodiments, the road quality data 270 may be normalized in a different way.

As described above, one or more road segments 104 may include man-made road anomalies, which may include railroad crossings and/or permanent fixtures such as manhole covers and/or drainage ditches, and which are not generally indicative of road quality, particularly less than ideal or normal road quality. For example, the presence of a railroad crossing on a road segment 104 is generally not indicative of the road quality of that road segment 104. The man-made road anomalies may nonetheless be falsely identified as being road imperfections that are generally indicative of road quality (i.e., they may be false positives). To prevent or at least minimize the impact of false positives on the road quality assessment and ensure that the road quality assessment is, to the extent possible, based only on true road imperfections, the analysis may include filtering the road quality data 270. More specifically, the obtained position data, motion data, speed data, time data, or combinations thereof, may be filtered. The filtering may be performed based on or using historical map data, such as previously obtained road quality data 270 or other road quality data, and/or data provided by the entity 160, such as, for example, maps of the geographic region 100 that indicate known man-made road anomalies. The filtering may, alternatively or additionally, be based on or using attributes of or about one or more road segments 104, such as speed limits, navigation related attributes (e.g., one or more road segments 104 is part of a highway or tollway), other parameters, data, or characteristics, or combinations thereof.

The filtering may, in some embodiments, include determining (e.g., identifying, recording) road quality data 270 that correspond to man-made road anomalies. The road quality data 270 may be compared to historical map data and/or data provided by the entity 160. For example, a map provided by the entity 160 may note a drainage ditch on one or more road segments 104, such that the road quality data 270 for these one or more road segments 104 may be determined to correspond to the drainage ditch (a man-made road anomaly). As another example, the server 258 may map the road quality data 270 for one or more road segments 104 over time to determine road quality data 270 that correspond to man-made road anomalies. Road quality data 270 that includes, for example, consistently high acceleration values over an extended period of time (e.g., 1 year), may be indicative of man-made road anomalies, in the form of permanent fixtures, rather than more temporary road imperfections (e.g., bumps, potholes).

The filtering may, alternatively or additionally, include determining (e.g., identifying, recording) any outlying road quality data 270, such as road quality data 270 that is extreme and/or is substantially inconsistent with other road quality data 270. For example, the filtering may include identifying any road quality data 270 for one or more road segments 104 obtained from one or more vehicles 108 that were speeding on or along the one or more road segments 104. As another example, the filtering may include identifying accelerometer values that are a specified number of standard deviations (e.g., 3 standard deviations) from the mean or average. In other embodiments, the road quality data 270 may be filtered in another way and/or using different data, parameters, or characteristics.

Road quality data 270 may be removed from the analysis and/or removed (e.g., deleted) from the road quality database 254 based on the filtering. For example, road quality data 270 that correspond to man-made road anomalies and/or are determined to be outlying road quality data 270 may be removed from the analysis and/or removed (e.g., deleted) from the road quality database 254.

The server 258 is configured to determine (e.g., assess, identify) the road quality of one or more of the road segments 104 in the road network 102 based on the analysis of the road quality data 270. As such, the server 258 may be configured to determine the road quality of one or more of the road segments 104 in the road network 102 based, at least in part, on normalized and/or filtered data 270.

In some embodiments, the road quality of one or more of the road segments 104 may be assessed by identifying one or more road imperfections in the one or more road segments 104. As noted above, the one or more road imperfections may be or include potholes, bumps, grooves, uneven road surfaces, rough road surfaces, other road imperfections, or combinations thereof. For example, the server 258 may identify that one of the road segments 104 includes a pothole. The server 258 may also identify the precise location (e.g., identify the GPS coordinates) of the one or more road imperfections along the one or more road segments 104. For example, the server 258 may identify that one of the road segments 104 includes a pothole on the East side of LaSalle Street between Madison Street and Monroe Street.

Alternatively or in addition thereto, the server 258 may identify the extent or degree of the one or more identified road imperfections. This may be accomplished by assigning an imperfection indicator, such as a score (e.g., using a 1-5 scale), a grade (e.g., A, F), or other value to each road imperfection and/or associating a verbal descriptor (e.g., deep, shallow, minor, major) with each road imperfection. For example, the server 258 may identify that one of the road segments 104 includes a deep or severe pothole on the West side of Wacker Drive between Washington Street and Randolph Street. The server 258 may, in one embodiment, rank the one or more identified road imperfections based on the degree or extent thereof, such as, for example, using the indicators assigned thereto.

The server 258 may, in some embodiments, assign a road quality indicator, such as a grade, a score (e.g., on a scale of 1-10), or other value, to each of the one or more road segments 104. For example, one road segment 104 may be assigned an F grade, indicating that the road segment 104 is in disrepair. The one or more road segments 104 may be ranked based on the assigned road quality indicator or based on some other criterion (e.g., based on the number of road imperfections). For example, the server 258 may rank the one or more road segments 104 in order of best-to-worst grade or highest-to-lowest score.

In some embodiments, the server 258 may be configured to formulate or generate one or more recommendations corresponding to one or more road segments 104 in the road network 102. The one or more recommendations are generally related to and configured to assist the entity 160 with the maintenance (e.g., repair) of the one or more road segments 104. The one or more recommendations are generated based on the determined or assessed road quality of the one or more road segments 104, as described above. The one or more recommendations may, for example, be generated based on the one or more identified road imperfections, the precise location of the one or more identified road imperfections, the extent of the one or more identified road imperfections, road quality indicators, or combinations thereof. The generation of the one or more recommendations may also be based on traffic usage data indicative of the usage of the one or more road segments 104, historical and/or expected weather data (e.g., seasonal deterioration patterns corresponding to one or more road segments 104), historical and/or expected capacity data for one or more road segments 104, attributes of the one or more road segments 104 (e.g., speed limits), or combinations thereof.

The one or more recommendations may be or include one or more recommendations for maintaining one or more road segments 104. The one or more recommendations may include recommendations to repair one or more road imperfections in the road segments 104. The recommended repairs may be or include major repairs (e.g., for a deep pothole), minor repairs (e.g., for a small bump), some other degree(s) of repair(s), or combinations thereof. The recommended repairs may include repaving, resurfacing, patching, replacing, removing, tearing up, smoothing out, or otherwise repairing the one or more road segments 104. For example, the recommendations may include recommendations to repair a pothole identified on the East side of Sheffield Ave. between Addison Ave. and Waveland Ave. and repave Waveland Ave. between Sheffield Ave. and Clark Ave. In other embodiments, the one or more recommendations may include preventive maintenance recommendations for the one or more road segments 104. For example, the recommendations may include recommendations to repave or resurface Lake Shore Drive based on the assessed road quality, traffic usage, expected capacity, seasonal deterioration patterns, or combinations thereof, of Lake Shore Drive.

The server 258 may or may not provide a recommended time period for implementing the one or more recommendations. The time period may be expressed in terms of days, weeks, months, or even years. The time period may be provided based on the urgency and/or the importance of the repair, and, more particularly, based on the type of the imperfection (e.g., a pothole vs. uneven surface), the precise location of the one or more imperfections, capacity data, traffic usage data (which may, for example, help assess the importance of the road segments 104), weather data, other data, or combinations thereof. For example, the recommendations may include a recommendation to repair a pothole identified on the East side of Sheffield Ave. between Addison Ave. and Waveland Ave. at some point in the next month based on the traffic usage of and expected capacity of these roads.

The server 258 is configured to form or generate one or more road quality reports. The server 258 may generate one road quality report for the entire road network 102, or one or more road segments therein, or a plurality of road quality reports (e.g., one for each road segment 104 in the road network 102. The one or more quality reports are indicative of the quality of one or more road segments 104 in the road network 102. The road quality reports are generated based on the determination or assessment of the road quality of one or more road segments 104. The road quality reports may thus include the identified one or more imperfections, the precise location of the one or more identified road imperfections, the extent of the one or more identified road imperfections, road quality indicators, other data indicative of the quality of the one or more road segments 104, or combinations thereof. In the embodiments in which the server 258 generates one or more recommendations, the road quality reports may also include the one or more recommendations. The road quality reports may be structured and/or stored in any number of different formats (e.g., email, SMS, .pdf, .txt, .xml, HTML, etc.)

The server 258 is configured to transmit the one or more road quality reports to the entity 160 via the network 172. The road quality report(s) may be transmitted to the entity 160 after it/they is/are generated (e.g., automatically by the server 258), at a later time, such as after connection to a wired network or a WiFi network, or combinations thereof. In other embodiments, the server 258 may transmit one or more of the road quality reports to the entity 160 in a different way (e.g., not using the network 172).

The entity 160 may, in turn, utilize the one or more road quality reports to maintain (e.g., repair) one or more road segments 104 in the road network 102. In embodiments in which one or more of the road quality reports includes one or more recommendations, the entity 160 may implement the recommendations, such as the recommendations to repair one or more road segments 104.

In other embodiments, one or more of the above-noted tasks (e.g., analyzing the obtained motion data, determining/assessing the road quality of one or more road segments 104, generating a road quality report) may be performed by or shared with different components of the system 150 (e.g., the mobile device(s) 158, the entity 160, etc.). For example, the mobile devices 158 may analyze the road quality data 270 that they obtain.

Figure 5:
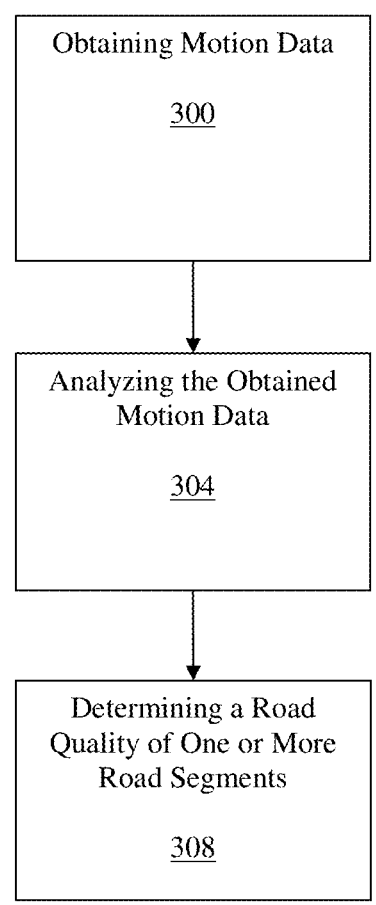
FIG. 5 depicts a flow chart showing one embodiment of a method for assessing the road quality of one or more road segments in a road network.

FIG. 5 shows a flow chart depicting a method or operation for assessing the road quality of one or more road segments (e.g., the road segments 104) in a road network (e.g., the road network 102). The method or operation may be implemented using the system 150 described above. In other embodiments, a different system may be used. The method is implemented in the order shown, but may be implemented in or according to any number of different orders. Additional, different, or fewer acts may be provided. For example, motion data may be obtained any number of different times. Accordingly, the analyzing and determining acts may be repeated each time motion data is obtained.

The method or operation includes obtaining motion data via a plurality of mobile devices (e.g., the plurality of mobile devices 158) associated with a plurality of vehicles (e.g., the plurality of vehicles 108) traveling in the road network (act 300). The road network includes a plurality of road segments (e.g., the road segments 104). In one embodiment, obtaining the motion data may include obtaining the motion data via one or more input sensors of each of the plurality of mobile devices. Obtaining the motion data via one or more input sensors may, for example, include obtaining three-axis motion data via an accelerometer (e.g., the accelerometer 228) of each of the plurality of mobile devices.

The method or operation includes analyzing the obtained motion data (act 304). Analyzing the obtained motion data includes normalizing the obtained motion data. In one embodiment, normalizing the obtained motion data may include normalizing the obtained motion data using or via standard deviation and/or normalizing the obtained motion data between the plurality of vehicles, the plurality of vehicles including two or more different vehicles. In one embodiment, analyzing the obtained motion data may further include filtering the obtained motion data to remove false positives (e.g., railroad crossings, drainage ditches, etc.) not indicative of the road quality.

The method or operation includes determining, based on the analyzing, a road quality of one or more of the plurality of road segments in the road network (act 308). In one embodiment, determining the road quality may include identifying one or more road imperfections in the one or more road segments, identifying a precise location of each of the one or more road imperfections, identifying an extent of the one or more road imperfections, or combinations thereof.

The method or operation may, in one embodiment, further include transmitting data indicative of the determined road quality to a data collection database associated with a governmental entity.

Figure 6:
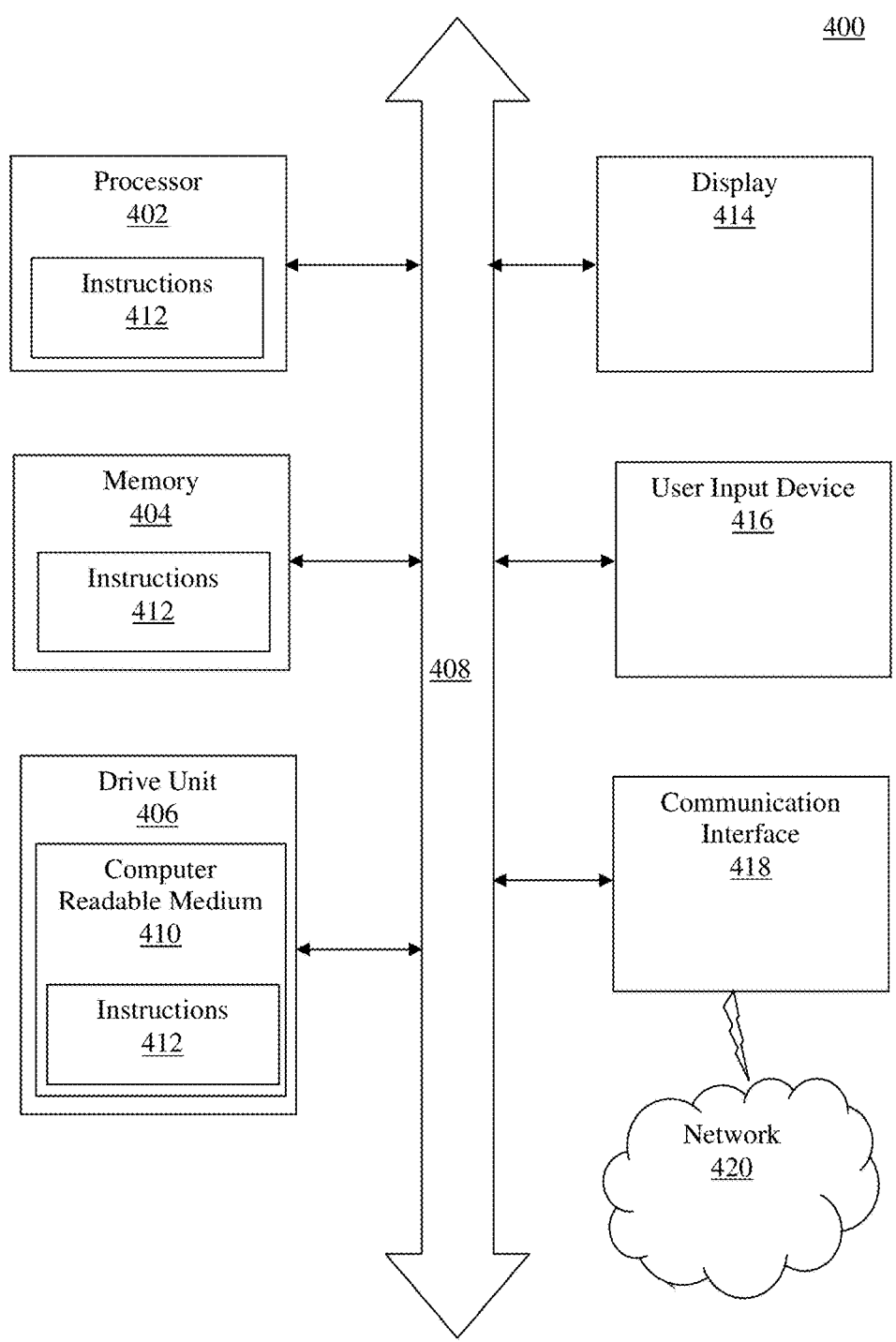
FIG. 6 depicts an exemplary computer system for use with the system of FIG. 2.

As noted above, the navigation system 154, the application 220, any other system or application, or individual components of any system or application may be implemented as computer program logic or computer readable program code stored in the memory and/or storage of a computer, such as the computer 400. FIG. 6 illustrates an embodiment of the computer system 400. The computer system 400 can include a set of instructions that can be executed to cause the computer system 400 to perform any one or more of the methods or computer based functions disclosed herein. The computer system 400 may operate as a standalone device or may be connected, e.g., using a network, to other computer systems or peripheral devices. Any of the components discussed above may be a computer system 400 or a component in the computer system 400.

In a networked deployment, the computer system 400 may operate in the capacity of a server or as a client user computer in a client-server user network environment, or as a peer computer system in a peer-to-peer (or distributed) network environment. The computer system 400 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 400 can be implemented using electronic devices that provide voice, video or data communication. Further, while a single computer system 400 is illustrated, the term "system" shall also be taken to include any collection of systems or sub-systems that individually or jointly execute a set, or multiple sets, of instructions to perform one or more computer functions.

As illustrated in FIG. 6, the computer system 400 may include a processor 402, e.g., a central processing unit (CPU), a graphics processing unit (GPU), or both. The processor 402 may be a component in a variety of systems. For example, the processor 402 may be part of a standard personal computer or a workstation. The processor 402 may be one or more general processors, digital signal processors, application specific integrated circuits, field programmable gate arrays, servers, networks, digital circuits, analog circuits, combinations thereof, or other now known or later developed devices for analyzing and processing data. The processor 402 may implement a software program, such as code generated manually (i.e., programmed).

The computer system 400 may include a memory 404 that can communicate via a bus 408. The memory 404 may be a main memory, a static memory, or a dynamic memory. The memory 404 may include, but is not limited to computer readable storage media such as various types of volatile and non-volatile storage media, including but not limited to random access memory, read-only memory, programmable read-only memory, electrically programmable read-only memory, electrically erasable read-only memory, flash memory, magnetic tape or disk, optical media and the like. In one embodiment, the memory 404 includes a cache or random access memory for the processor 402. In alternative embodiments, the memory 404 is separate from the processor 402, such as a cache memory of a processor, the system memory, or other memory. The memory 404 may be an external storage device or database for storing data. Examples include a hard drive, compact disc ("CD"), digital video disc ("DVD"), memory card, memory stick, floppy disc, universal serial bus ("USB") memory device, or any other device operative to store data. The memory 404 is operable to store instructions executable by the processor 402. The functions, acts or tasks illustrated in the figures or described herein may be performed by the programmed processor 402 executing the instructions stored in the memory 404. The functions, acts or tasks are independent of the particular type of instructions set, storage media, processor or processing strategy and may be performed by software, hardware, integrated circuits, firmware, microcode and the like, operating alone or in combination. Likewise, processing strategies may include multiprocessing, multitasking, parallel processing and the like.

As shown, the computer system 400 may further include a display unit 414, such as a liquid crystal display (LCD), an organic light emitting diode (OLED), a flat panel display, a solid state display, a cathode ray tube (CRT), a projector, a printer or other now known or later developed display device for outputting determined information. The display 414 may act as an interface for the user to see the functioning of the processor 402, or specifically as an interface with the software stored in the memory 404 or in the drive unit 406.

Additionally, the computer system 400 may include an input device 416 configured to allow a user to interact with any of the components of system 400. The input device 416 may be a number pad, a keyboard, or a cursor control device, such as a mouse, or a joystick, touch screen display, remote control or any other device operative to interact with the system 400.

In a particular embodiment, as depicted in FIG. 6, the computer system 400 may also include a disk or optical drive unit 406. The disk drive unit 406 may include a computer-readable medium 410 in which one or more sets of instructions 412, e.g. software, can be embedded. Further, the instructions 412 may embody one or more of the methods or logic as described herein. In a particular embodiment, the instructions 412 may reside completely, or at least partially, within the memory 404 and/or within the processor 402 during execution by the computer system 400. The memory 404 and the processor 402 also may include computer-readable media as discussed above.

The present disclosure contemplates a computer-readable medium that includes instructions 412 or receives and executes instructions 412 responsive to a propagated signal, so that a device connected to a network 420 can communicate voice, video, audio, images or any other data over the network 420. Further, the instructions 412 may be transmitted or received over the network 420 via a communication port 418. The communication port 418 may be a part of the processor 402 or may be a separate component. The communication port 418 may be created in software or may be a physical connection in hardware. The communication port 418 is configured to connect with a network 420, external media, the display 414, or any other components in system 400, or combinations thereof. The connection with the network 420 may be a physical connection, such as a wired Ethernet connection or may be established wirelessly as discussed below. Likewise, the additional connections with other components of the system 400 may be physical connections or may be established wirelessly.

The network 420 may include wired networks, wireless networks, or combinations thereof. The wireless network may be a cellular telephone network, an 802.11, 802.16, 802.20, or WiMax network. Further, the network 420 may be a public network, such as the Internet, a private network, such as an intranet, or combinations thereof, and may utilize a variety of networking protocols now available or later developed including, but not limited to TCP/IP based networking protocols.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP, HTTPS) represent examples of the state of the art. Such standards are periodically superseded by faster or more efficient equivalents having essentially the same functions. Accordingly, replacement standards and protocols having the same or similar functions as those disclosed herein are considered equivalents thereof.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

As used in this application, the term 'circuitry' or 'circuit' refers to all of the following: (a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present.

This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in server, a cellular network device, or other network device.

Processors suitable for the execution of a computer program include, by way of example, both general and special purpose microprocessors, and anyone or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a device having a display, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings and described herein in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

It is intended that the foregoing detailed description be regarded as illustrative rather than limiting and that it is understood that the following claims including all equivalents are intended to define the scope of the invention. The claims should not be read as limited to the described order or elements unless stated to that effect. Therefore, all embodiments that come within the scope and spirit of the following claims and equivalents thereto are claimed as the invention.

I claim:

1. A method for providing a recommendation for repairing an identified imperfection of a road segment, the method comprising:
    obtaining, by a road quality server comprising at least one processor, a memory storing computer program code, and a communication interface configured to communicate via at least one network, motion data via a plurality of mobile devices associated with a plurality of different vehicles traveling in a road network, the road network comprising a plurality of road segments, wherein (a) each mobile device of the plurality of mobile devices is onboard a vehicle of the plurality of different vehicles and (b) each instance of motion data is captured by one or more sensors onboard the corresponding vehicle, and (c) a portion of the motion data is obtained from one of the plurality of mobile devices immediately after the one of the plurality of mobile devices leaves a road segment of the road network;
    normalizing, by the road quality server via execution of at least a portion of the computer program code by the at least one processor, the motion data obtained from the plurality of mobile devices associated with the plurality of different vehicles, the normalizing preventing or minimizing (a) errors, (b) inconsistencies, or (c) errors and inconsistencies due to differences in at least one of mechanical systems or sensors of the plurality of different vehicles, wherein normalizing comprises:
        calculating a first standard deviation of motion data for one of the plurality of road segments,
        calculating a second standard deviation of motion data for each of the plurality of mobile devices, and
        calculating, for each of the plurality of mobile devices, a percent difference based on the first standard deviation and the second standard deviation;
    determining, by the road quality server via execution of at least a portion of the computer program code by the at least one processor and based on the normalized motion data, a road quality of one or more of the plurality of road segments in the road network,
    identifying, based on the road quality of the one or more of the plurality of road segments and the normalized motion data, an imperfection in the one or more of the plurality of road segments;
    determining, based on the identified imperfection, a recommendation for repairing a corresponding road segment; and
    transmitting, by the road quality server, data indicative of the determined road quality and the recommendation for repairing the corresponding road segment to a data collection database associated with a third party for use in repairing one or more of the plurality of road segments.

2. The method of claim 1, wherein obtaining the motion data comprises obtaining the motion data via one or more input sensors of each of the plurality of mobile devices.

3. The method of claim 2, wherein obtaining the motion data via one or more input sensors comprises obtaining three-axis motion data via an accelerometer of each of the plurality of mobile devices.

4. The method of claim 1, wherein normalizing the obtained motion data further comprises normalizing the obtained motion data using standard deviation:
    weighting the percent difference based on a number of data points collected by each of the plurality of mobile devices for the one of the plurality of road segments; and
    summing the weighted percent differences for one of the plurality of mobile devices to determine a percentage above or below the average road quality value for the one of the plurality of road segments.

5. The method of claim 1, wherein normalizing the obtained motion data comprises normalizing the obtained motion data between the plurality of different vehicles, the plurality of different vehicles comprising two or more different vehicles.

6. The method of claim 1, wherein analyzing the obtained motion data further comprises filtering the obtained motion data to remove false positives not indicative of the road quality.

7. The method of claim 6, wherein filtering the motion data comprises minimizing the impact of man-made road anomalies on the determined road quality.

8. The method of claim 7, wherein the man-made road anomalies are identified based on historical map data.

9. The method of claim 1, further comprising:
    identifying a precise location of the identified imperfection; and
    identifying an extent of the identified imperfection.

10. The method of claim 1, wherein normalizing the obtained motion data comprises filtering the obtained motion data to remove false positives not indicative of the road quality, and wherein determining the road quality of one or more road segments comprises identifying one or more road imperfections in the one or more road segments based on the normalizing and the filtering.

11. An apparatus comprising:
    at least one processor;
    a communication interface configured to communicate via at least one network; and
    at least one memory including computer program code for one or more programs, the at least one memory and the computer program code configured to, with the at least one processor, cause the apparatus to perform at least the following:
        obtain, via the communication interface, motion data via a plurality of different mobile devices associated with a plurality of different vehicles traveling in a road network, the road network comprising a plurality of road segments, wherein (a) each mobile device of the plurality of different mobile devices is onboard a vehicle of the plurality of different vehicles and (b) a portion of the motion data is obtained from one of the plurality of mobile devices immediately after the one of the plurality of the mobile devices leaves a road segment of the road network;

normalize the obtained motion data to minimize inconsistencies due to differences in the plurality of different vehicles using standard deviation of motion data for the plurality of road segments and standard deviation of motion data for each mobile device associated with a vehicle;

analyze the normalized motion data;

determine, based on the analyzed motion data, a road quality of one or more of the plurality of road segments in the road network;

identify an imperfection in at least one road segment of the of the plurality of road segments based on the road quality and the analyzed motion data;

determine a recommendation for repairing a corresponding road segment of the plurality of road segments based on the identified imperfection;

generate a road quality report comprising data indicative of the determined road quality, the identified imperfection, the recommendation for repairing the corresponding road segment, and transmit, via the communication interface, the road quality report to an entity automatically upon generating the road quality report.

12. The apparatus of claim 11, wherein the at least one memory and the computer program code are configured to, with the at least one processor, cause the apparatus to:

filter the obtained motion data to remove false positives not indicative of the road quality of the one or more of the plurality of road segments.

13. The apparatus of claim 11, wherein the entity is a governmental entity.

14. A system comprising:

a server configured to obtain, via a communication interface configured to communicate via at least one network and from a plurality of mobile devices, motion data collected via the plurality of mobile devices, the plurality of mobile devices associated with a plurality of different vehicles traveling over a road network, the road network comprising a plurality of road segments, wherein (a) each mobile device of the plurality of mobile devices is onboard a vehicle of the plurality of different vehicles, and (b) a portion of the motion data is obtained from one of the plurality of mobile devices immediately after the one of the plurality of the mobile devices leaves a road segment of the road network, wherein the server is configured to normalize the motion data to minimize inconsistencies due to different responses of the plurality of different vehicles to a set of road anomalies and filter the motion data to remove false positives not indicative of the road quality, wherein to normalize the obtained motion data, the server uses standard deviation motion data for the plurality of road segments and standard deviation data for each mobile device associated with a vehicle of the plurality of different vehicles, wherein the server is configured to determine a road quality of one or more of the plurality of road segments based on an analysis of the normalized motion data, wherein the server is configured to identify an imperfection of a corresponding road segment of the plurality of road segments based on the road quality and the analysis of the normalized motion data;

wherein the server is configured to determine, based on the identified imperfection, a recommendation for repairing the corresponding road segment; and wherein the server is configured to generate and transmit via the communication interface a road quality report based on the determined road quality of the one or more of the plurality of road segments, the road quality report comprising the recommendation for repairing the corresponding road segment for use in repairing one or more of the plurality of of the road segments.

15. The system of claim 14, wherein the server is configured to filter the motion data based on historical map data for the road network.

16. The system of claim 14 wherein the server is configured to transmit the road quality report to a governmental or business organization.

17. The system of claim 16 wherein the governmental or business organization repairs or maintains one or more road segments based on the transmitted road quality report.

18. The system of claim 14, wherein filtering the motion data comprises minimizing an impact of man-made road anomalies on the determined road quality.

* * * * *